US012683344B2

(12) United States Patent
Cavallieri et al.

(10) Patent No.: US 12,683,344 B2
(45) Date of Patent: Jul. 14, 2026

(54) HEADER POWER CONNECTOR

(71) Applicants: TE CONNECTIVITY BRASIL INDUSTRIA DE ELECTRONICOS LTDA, Braganca Paulista (BR); TE Connectivity Solutions GmbH, Schaffhausen (CH)

(72) Inventors: Amadeu Luiz Fazani Cavallieri, Campinas (BR); Xiaobao Geng, Troy, MI (US); Skyler Krathwohl, Winston Salem, NC (US)

(73) Assignee: TE Connectivity Solutions GmbH (CH)

( * ) Notice: Subject to any disclaimer, the term of this patent is extended or adjusted under 35 U.S.C. 154(b) by 366 days.

(21) Appl. No.: 18/415,990

(22) Filed: Jan. 18, 2024

(65) Prior Publication Data

US 2025/0239825 A1 Jul. 24, 2025

(51) Int. Cl.
*H01R 31/06* (2006.01)

(52) U.S. Cl.
CPC ....... *H01R 31/065* (2013.01); *H01R 2201/26* (2013.01)

(58) Field of Classification Search
CPC .......................... H01R 31/065; H01R 2201/26
USPC ..................................................... 439/620.22
See application file for complete search history.

(56) References Cited

U.S. PATENT DOCUMENTS

| | | | | |
|---|---|---|---|---|
| 5,098,318 A * | 3/1992 | Suter | H02B 11/04 | 200/255 |
| 7,549,882 B2 * | 6/2009 | Kimura | H01R 13/6315 | 439/260 |
| 7,581,972 B2 * | 9/2009 | Daamen | H01R 13/6315 | 439/249 |
| 8,998,618 B2 * | 4/2015 | Hashiguchi | H01R 13/113 | 439/787 |
| 10,622,768 B1 * | 4/2020 | Cowham | H01R 24/28 | |
| 11,848,518 B2 * | 12/2023 | Cavallieri | H01R 13/502 | |
| 12,463,380 B2 * | 11/2025 | Cavallieri | H01R 13/62922 | |
| 2012/0156909 A1 * | 6/2012 | Tyler | H01R 13/6315 | 439/259 |
| 2019/0305459 A1 * | 10/2019 | Mori | H01R 13/113 | |
| 2023/0208078 A1 * | 6/2023 | Behling | H01H 1/42 | 439/248 |

* cited by examiner

*Primary Examiner* — Harshad C Patel

(57) ABSTRACT

A header power connector includes a header housing including an outer housing and a terminal holder. The terminal holder forms a terminal channel and includes a front opening and a rear opening. The header power connector includes a plurality of terminals arranged in a stacked configuration in the terminal channel. Each terminal includes a terminal base, a front socket flanked by front spring beams, and a rear socket flanked by rear spring beams. The rear socket is aligned with the rear opening to receive a power supply element and the rear spring beams engage the power supply element. The header power connector includes a printed circuit board having power pads on upper and lower surfaces and an edge received in the front opening to electrically connect to the power pads at the upper and lower surfaces of the printed circuit board.

20 Claims, 7 Drawing Sheets

HEADER POWER CONNECTOR

BACKGROUND OF THE INVENTION

The subject matter herein relates generally to header power connectors.

Power connectors are used to transfer power between electrical components. For example, in an electric vehicle, a power connector is used to electrically connect two components, such as an inverter with an electric motor or the inverter with a battery. Typically, the power is supplied by coupling a cable mounted plug connector to a header power connector. The plug connector may be manipulated and moved into position for mating with the header power connector. The plug connector increases overall cost of the system being an extra component extending between the electrical components. Additionally, alignment of the electrical components with the header power connector is difficult and may lead to improper mating and damage to the components. Some components include a printed circuit board within the device. The printed circuit board is electrically connected to power terminals, such as through wires, which add cost and complexity to assembly. There is a desire to eliminate components and thus reduce the cost of the system.

BRIEF DESCRIPTION OF THE INVENTION

In one embodiment, a header power connector is provided and includes a header housing including an outer housing and a terminal holder received in a cavity of the outer housing. The outer housing has a base and an outer wall extending from the base to form the cavity. The terminal holder has a holder body forming a terminal channel. The terminal holder has a front opening at a front of the terminal holder and a rear opening at a rear of the terminal holder. The header power connector includes a terminal stack received in the terminal channel. The terminal stack includes a plurality of terminals arranged in a stacked configuration. Each terminal includes a terminal base, a front mating end forward of the terminal base and a rear mating end rearward of the terminal base. The front mating end includes a front socket flanked by front spring beams. The rear mating end includes a rear socket flanked by rear spring beams. The front socket aligned with the front opening. The rear socket aligned with the rear opening and configured to receive a power supply element. The rear spring beams are configured to engage opposite sides of the power supply element. The header power connector includes a printed circuit board having power pads along upper and lower surfaces of the printed circuit board. The printed circuit board has an edge configured to be received in the front opening. The front spring beams are electrically connected to the power pads at the upper and lower surfaces of the printed circuit board to supply power to the printed circuit board.

In another embodiment, a header power connector is provided and includes a component housing forming an enclosure. The component housing holds at least one electrical component in the enclosure. The header power connector includes a printed circuit board received in the enclosure. The printed circuit board is electrically connected to the at least electrical component. The printed circuit board includes power pads along upper and lower surfaces of the printed circuit board. The printed circuit board has an edge. The header power connector includes a header housing that includes an outer housing coupled to the component housing and a terminal holder received in a cavity of the outer housing. The outer housing has a base and an outer wall extending from the base to form the cavity. The terminal holder has a holder body forming a terminal channel. The terminal holder has a front opening at a front of the terminal holder and a rear opening at a rear of the terminal holder. The header power connector includes a terminal stack received in the terminal channel. Terminal stack includes a plurality of terminals arranged in a stacked configuration. Each terminal includes a terminal base, a front mating end forward of the terminal base and a rear mating end rearward of the terminal base. The rear mating end includes a rear socket flanked by rear spring beams. The rear socket aligned with the rear opening and configured to receive a power supply element. The rear spring beams are configured to engage opposite sides of the power supply element. The front mating end includes a front socket flanked by front spring beams. The front socket aligned with the front opening. The edge of the printed circuit board is received in the front opening. The front spring beams are electrically connected to the power pads at the upper and lower surfaces of the printed circuit board to supply power to the printed circuit board.

In a further embodiment, a header power connector is provided and includes a header housing including an outer housing and a terminal holder received in a cavity of the outer housing. The outer housing has a base and an outer wall extending from the base to form the cavity. The terminal holder has a holder body forming a terminal channel. The terminal holder has a front opening at a front of the terminal holder and a rear opening at a rear of the terminal holder. The header power connector includes a terminal stack received in the terminal channel. Terminal stack includes a plurality of terminals arranged in a stacked configuration. Each terminal includes a terminal base, a front mating end forward of the terminal base and a rear mating end rearward of the terminal base. The front mating end includes a front socket flanked by front spring beams. The rear mating end includes a rear socket flanked by rear spring beams. The front socket aligned with the front opening. The rear socket aligned with the rear opening and configured to receive a power supply element. The rear spring beams are configured to engage opposite sides of the power supply element. The header power connector includes a printed circuit board assembly that includes a printed circuit board and a power adapter coupled to an edge of the printed circuit board. The printed circuit board has power pads along upper and lower surfaces of the printed circuit board. The power adapter has an upper portion extending along the upper surface of the printed circuit board coupled to the power pad on the upper surface of the printed circuit board. The power adapter has a lower portion extending along the lower surface of the printed circuit board coupled to the power pad on the lower surface of the printed circuit board. The power adapter has a mating portion configured to be received in the front opening. The front spring beams are configured to engage the mating portion of the power adapter. The power adapter electrically connects the front spring beams to the power pads at the upper and lower surfaces of the printed circuit board to supply power to the printed circuit board.

DETAILED DESCRIPTION OF THE INVENTION

Figure 1:
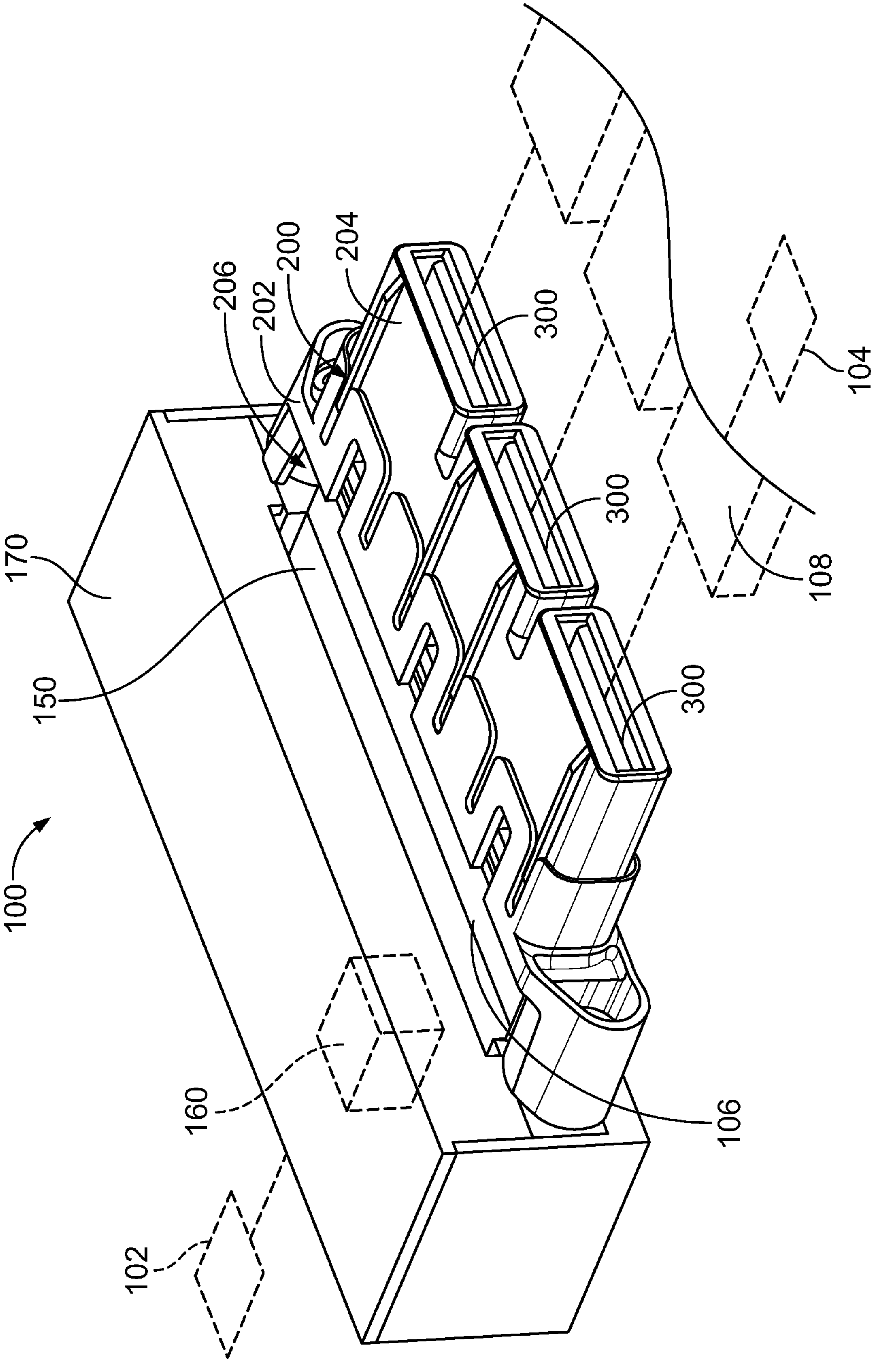
FIG. 1 is a schematic view of a header power connector in accordance with an exemplary embodiment.

FIG. 1 is a schematic view of a header power connector 100 in accordance with an exemplary embodiment. The header power connector 100 is used to electrically connect a first electrical device 102 and a second electrical device 104. The header power connector 100 may be mounted to or integrated with the first electrical device 102. Optionally, one or more components of the first electrical device 102 may extend into or be located within the header power connector 100. In various embodiments, the header power connector 100 is directly coupled to the first electrical device 102. In various embodiments, the header power connector 100 is directly coupled to the second electrical device 104. The second electrical device 104 may be a power supply to supply power to the first electrical device 102, or vice versa.

In various embodiments, the first and second electrical devices 102, 104 may be part of an electric vehicle. For example, the first electrical device 102 may be an inverter and the second electrical device 104 may be an electric motor. The first electrical device 102 may be an inverter and the second electrical device 104 may be a battery module. The first electrical device 102 may be a high voltage junction box and the second electrical device 104 may be a battery module. The first electrical device 102 may be a heater and the second electrical device 104 may be a DC converter. The electrical devices 102, 104 may be other components of the electric vehicle. The header power connector 100 may be used to electrically connect other types of electrical components in alternative embodiments, such as within appliances, industrial devices, or other types of machines.

In an exemplary embodiment, the first electrical device 102 includes a first power element 106 and the second electrical device 104 includes a second power element 108. The first and second power elements 106, 108 are configured to be plugged directly into opposite ends of the header power connector 100. The header power connector 100 electrically connects the first and second power elements 106, 108 to transmit power between the first and second electrical devices 102, 104. In an exemplary embodiment, the first power element 106 is a printed circuit board 150. The first power element 106 may include a power adapter coupled to the printed circuit board 150 to electrically connect the printed circuit board 150 to the terminals of the header power connector 100. Optionally, the header power connector 100 may be mated to or include a plurality of the second power elements 108.

In an exemplary embodiment, the second power element 108 is a metal plate, such as a busbar or blade terminal. The second power element 108 may be a printed circuit board in other embodiments. Optionally, the header power connector 100 may be mated to a plurality of the second power elements 108. The power elements 108 of the second electrical device 104 are configured to be plugged directly into the header power connector 100. Optionally, the header power connector 100 may be initially mounted to the first electrical device 102 and mated with the second electrical device 104, such as when the first electrical device 102 is mounted to the second electrical device 104.

The header power connector 100 includes a component housing 170 holding the printed circuit board 150 and one or more electrical components 160, which are connected to (for example, mounted to) the printed circuit board 150. The header power connector 100 includes a header housing 200 and one or more terminals 300 (shown in FIG. 2) held by the header housing 200. The header housing 200 is coupled to the component housing 170. The terminals 300 are electrically connected to the printed circuit board 150. For example, the terminals 300 may be directly connected to the printed circuit board 150. In other embodiments, the terminals 300 are connected to the printed circuit board through a power adapter, such as a metal cap coupled to an edge of the printed circuit board 150.

In an exemplary embodiment, the header housing 200 is a multipiece housing assembly. For example, the header housing 200 includes an outer housing 202 and a terminal holder 204. The terminal holder 204 holds the terminals 300. The terminal holder 204 is received in a cavity 206 of the outer housing 202. In an exemplary embodiment, the outer housing 202 is configured to be mounted to the component housing 170. In an exemplary embodiment, the terminal holder 204 is movable relative to the outer housing 202 to accommodate alignment and mating with the second electrical device 104. For example, the terminal holder 204 may be tilted or rotated within the outer housing 202 to accommodate misalignment of the first and second power elements 106, 108. The terminal holder 204 has a limited amount of contained movement relative to the outer housing 202. The outer housing 202 is shaped to control and contain the movement of the terminal holder 204 during mating. For example, the outer housing 202 may allow the terminal holder 204 to rotate a predetermined amount to allow mating with the power elements 106 (for example, mating with the printed circuit board 150). In an exemplary embodiment, the terminals 300 also have a limited amount of contained movement relative to the terminal holder 204 to accommodate the misalignment of the first and second power elements 106, 108 during mating.

Figure 2:
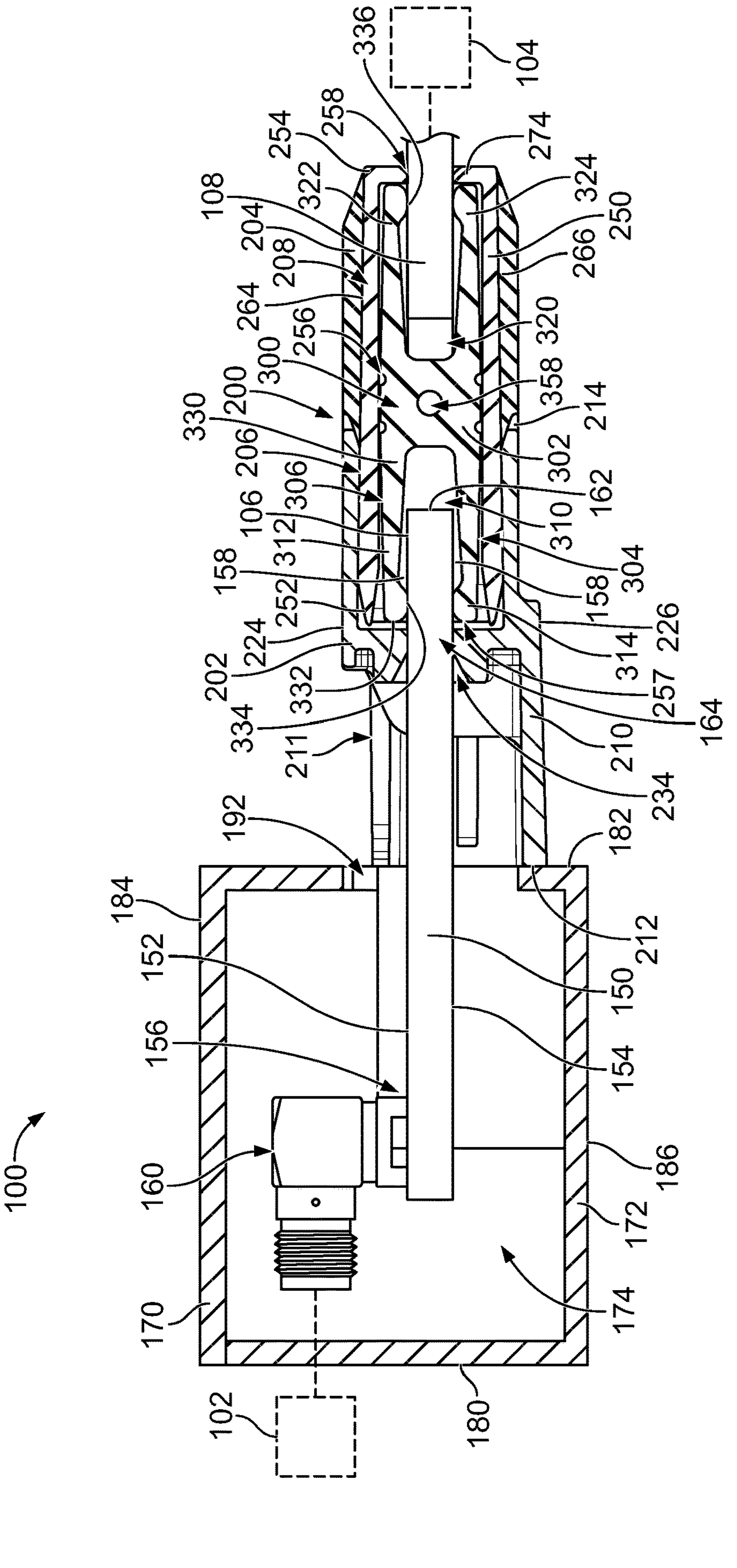
FIG. 2 is a cross sectional view of the header power connector in accordance with an exemplary embodiment.
Figure 3:
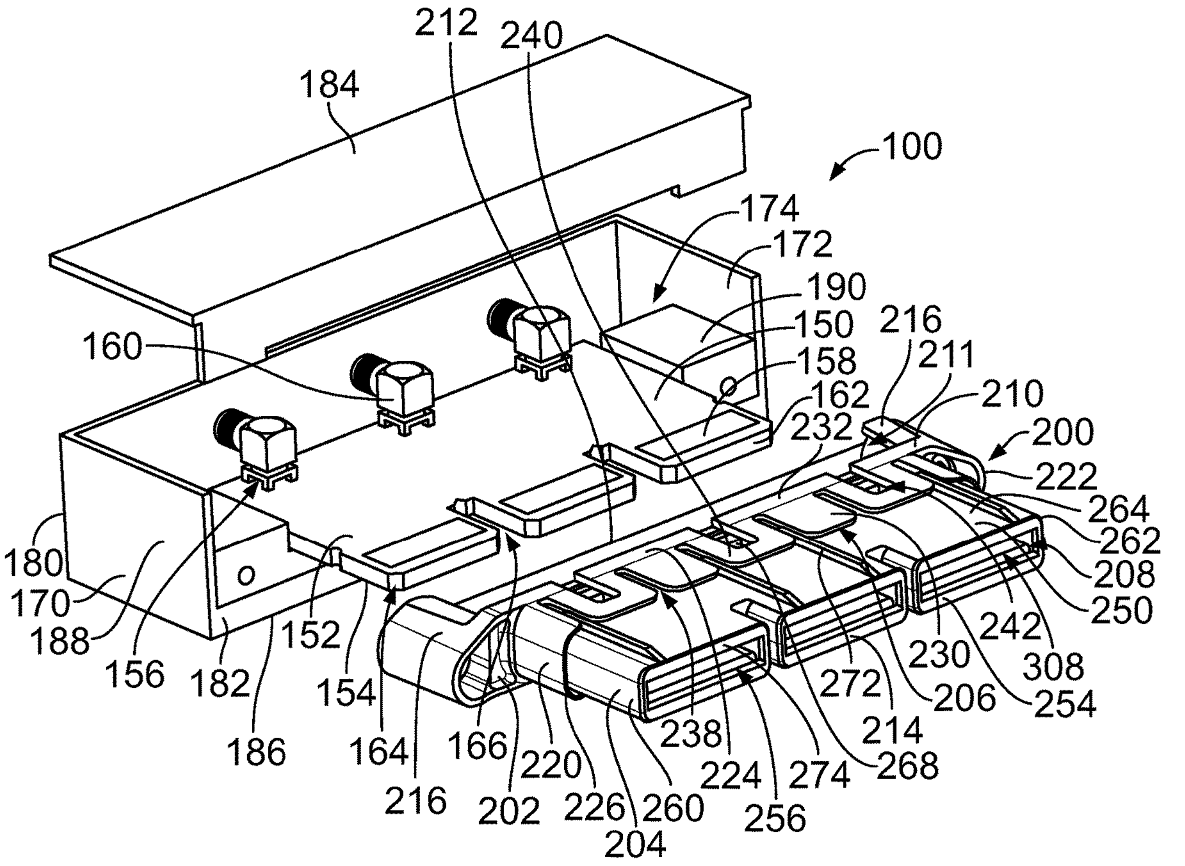
FIG. 3 is an exploded view of the header power connector in accordance with an exemplary embodiment.
Figure 4:
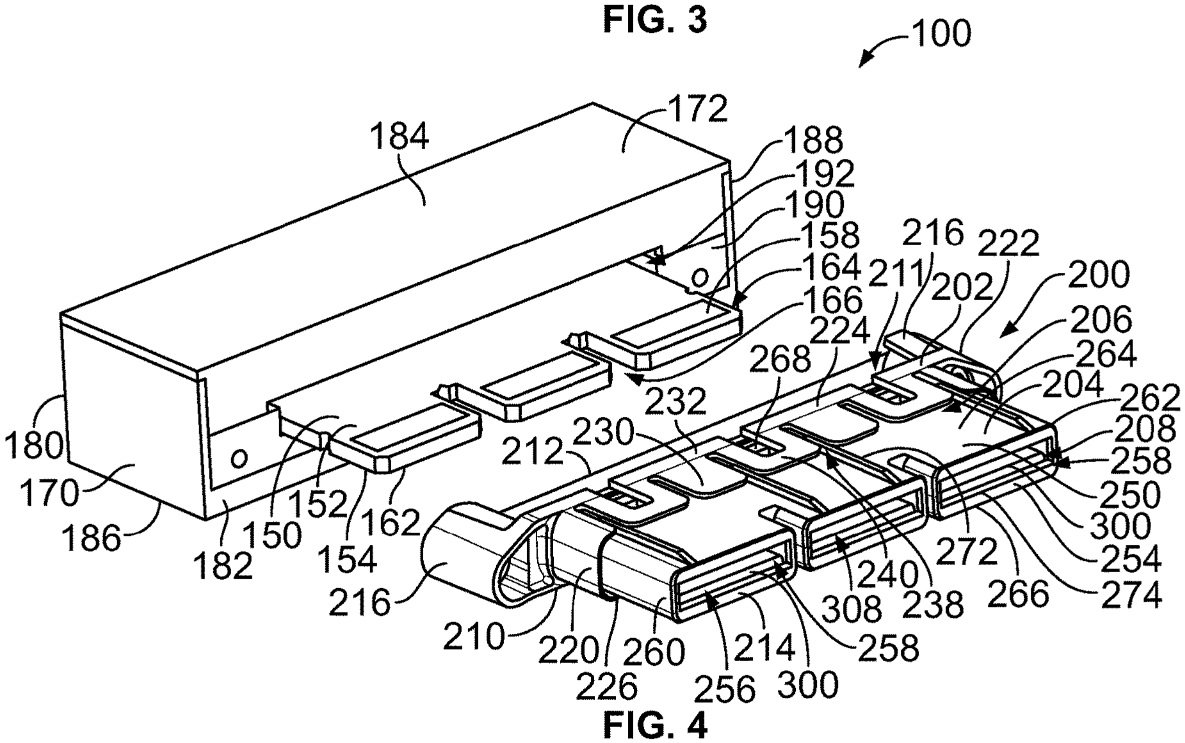
FIG. 4 is a perspective view of the header power connector showing the header housing and the terminals poised for mating with the power elements of the printed circuit board in accordance with an exemplary embodiment.

FIG. 2 is a cross sectional view of the header power connector 100 in accordance with an exemplary embodiment. FIG. 3 is an exploded view of the header power connector 100 in accordance with an exemplary embodiment. FIG. 4 is a perspective view of the header power connector 100 showing the header housing 200 and the terminals 300 poised for mating with the power elements 106 of the printed circuit board 150 in accordance with an exemplary embodiment.

The component housing 170 includes walls 172 forming an enclosure 174. The printed circuit board 150 is received in the enclosure 174. The printed circuit board 150 may be held by one or more of the walls 172. The walls 172 of the component housing 170 may surround one or more of the electrical components 160, which are mounted to the printed circuit board 150. The walls 172 may support or hold the electrical components 160.

In an exemplary embodiment, the component housing 170 is box-shaped, such as being rectangular. The component housing 170 may have other shapes in alternative embodiments. In an exemplary embodiment, the component housing incudes a front 180 and a rear 182 opposite the front 180. The front 180 may be mounted to or extend from the first electronic device 102. The header housing 200 extends from the rear 182. The component housing 170 includes a top 184 and a bottom 186. The top 184 may be a cover coupled to the other walls 172 of the component housing 170. The wall 172 at the bottom 186 may support the printed circuit board 150. The component housing 170 includes sides 188 between the front 180 and the rear 182 and/or between the top 184 and the bottom 186.

In an exemplary embodiment, the component housing 170 includes mounting lugs 190. The header housing 200 may be coupled to the mounting lugs 190, such as using fasteners. The mounting lugs 190 are located at the sides 188 in the illustrated embodiment. Other locations are possible in alternative embodiments. The mounting lugs 190 may be used to position and/or secure the printed circuit board 150 in the enclosure 174. Other types of securing features may be used in alternative embodiments to secure the printed circuit board 150 in the component housing 170. In an exemplary embodiment, the component housing 170 includes a rear opening 192 at the rear 182. In an exemplary embodiment, a portion of the printed circuit board 150 passes through the rear opening 192 to an exterior of the component housing 170, such as for mating with the header housing 200 and the terminals 300.

The printed circuit board 150 includes an upper surface 152 and a lower surface 154. The printed circuit board 150 includes at least one mounting area 156. The electrical component(s) 160 are mounted to the printed circuit board 150 at the mounting areas 156. In an exemplary embodiment, the printed circuit board 150 includes power pads 158 on the upper surface 152 and/or the lower surface 154. The power pads 158 are configured to be electrically coupled to the terminals 300. The power pads 158 may be directly connected to the terminals 300 in some embodiments. In other various embodiments, the power pads 158 are indirectly connected to the terminals 300, such as through a power adapter coupled to the power pads 158.

The printed circuit board 150 includes an edge 162 configured to be mated to the header housing 200. The edge 162 may be loaded into the header housing 200, such as to mate with the terminals 300. In an exemplary embodiment, the printed circuit board 150 includes card portions 164 at the rear. The card portions 164 extend to the edge 162. In an exemplary embodiment, the card portions 164 are located exterior of the component housing 170, such as rearward of the component housing 170, for plugging into the header housing 200. The power pads 158 are located along the card portions 164, such as along the upper surface 152 and the lower surface 154. The card portions 164 are configured to be plugged into corresponding portions of the header housing 200 to mate with corresponding terminals 300. The card portions 164 are separated by gaps 166. In alternative embodiments, the printed circuit board 150 includes a single card portion 164 at the rear configured to be plugged into the header housing 200.

In an exemplary embodiment, a plurality of the terminals 300 are stacked together in a terminal stack 308. Each terminal 300 is a double ended socket terminal configured to receive the first and second power elements 106, 108 (shown in FIG. 1) in opposite ends of the terminal 300. Other types of terminals may be used in alternative embodiments. The terminal stack 308 is arranged in the header housing 200. In an exemplary embodiment, the header power connector 100 has a plurality of terminal stacks 308 arranged in different compartments for mating with different power elements 106, 108. For example, three terminal stacks 308 are shown in the illustrated embodiment. The terminals 300 are arranged side-by-side in the terminal stack 308. The terminals 300 function as a single terminal assembly within the terminal stack 308. However, the terminals 300 are independently movable relative to each other. The terminals 300 may be stamped and formed from thin metal sheets, but stacked together to increase the overall current carrying capacity of the terminal assembly.

Each terminal 300 is a stamped and formed terminal manufactured from a metal material, such as a copper material. The terminal 300 may have one or more plating layers, such as a nickel plating layer and/or a gold plating layer. The terminal 300 includes a terminal base 302 (FIG. 2), a front mating end 304 (FIG. 2) at a first side of the terminal base 302, and a rear mating end 306 (FIG. 2) at a second side of the terminal base 302. Optionally, the front mating end 304 and the rear mating end 306 may be identical.

The terminal 300 has a front socket 310 at the front mating end 304. The terminal 300 includes a first front spring beam 312 extending along the first side (for example, top) of the front socket 310 and a second front spring beam 314 extending along the second side (for example, bottom) of the front socket 310.

The terminal includes a rear socket 320 at the rear mating end 306. The terminal 300 includes a first rear spring beam 322 extending along the first side (for example, top) of the rear socket 320 and a second rear spring beam 324 extending along the second side (for example, bottom) of the rear socket 320.

In an exemplary embodiment, the spring beams 312, 314, 322, 324 may be identical to one another. The spring beams 312, 314, 322, 324 may be deflectable when mated to the corresponding power elements 106 or 108. For example, the spring beams 312, 314, 322, 324 may be deflected outward when mated to the power element 106 or 108 to create an internal inward biasing force within the spring beams 312, 314, 322, 324 to maintain electrical contact between the spring beams 312, 314, 322, 324 and the power elements 106 or 108.

In an exemplary embodiment, each spring beam 312, 314, 322, 324 includes a base 330 and a tip 332 at the distal end of the spring beam. The base 330 extends from the terminal base 302. Optionally, the spring beam may be widest at the base 330. In an exemplary embodiment, the spring beam narrows from the base 330 toward the tip 332. In an exemplary embodiment, the spring beam includes a bulge 334 near the tip 332. Optionally, the bulge 334 may be bulged inward toward the socket 310, 320. The bulge 334 has a curved surface defining a mating interface 336 configured to be mated with the corresponding power element 106 or 108. The spring beam includes an inner surface and an outer surface opposite the inner surface. In various embodiments, the inner surface and the outer surface are tapered inward from the base 330 toward the tip 332. Optionally, the inner surface may be tapered inward at a greater angle than the outer surface.

The terminal base 302 is located generally at the central portion of the terminal 300, such as between the front mating end 304 and the rear mating end 306. The terminal base 302 includes a front end and a rear end. The terminal base 302 includes a first side and a second side. The front spring beams 312, 314 extend from the front end at the first and second sides. The rear spring beams 322, 324 extend from the rear end at the first and second sides. In an exemplary embodiment, the terminal base 302 includes an opening 358 therethrough. Optionally, the opening 358 may be approximately centered between the front end and the rear end and may be approximately centered between the first side and the second side. The opening 358 may receive a portion of the header housing 200 to locate and/or retain the terminal 300 in the header housing 200. For example, an axle may extend through the opening 358. Optionally, the terminal 300 may be rotatable about the axle, such as to shift the relative positions of the front mating end 304 and the rear mating end 306.

The outer housing 202 includes an outer wall 210 surrounding the cavity 206. Optionally, the outer wall 210 may include an opening 211, such as at the top, such as to receive the printed circuit board 150 during assembly. The outer wall 210 extends between a front end 212 and a rear end 214 of the outer housing 202. The opening 211 may be provided at the front end 212. In an exemplary embodiment, the front end 212 is configured to be mounted to the component housing 170 such that the header power connector 100 extends rearward from the component housing 170. For example, the outer wall 210 may abut against the component housing 170. Other mounting orientations are possible in alternative embodiments. The terms front and rear are used herein in reference to the orientation illustrated in the figures.

The outer housing 202 includes mounting brackets 216 at opposite sides 220, 222 of the outer housing 202. The mounting brackets 216 may receive fasteners to secure the outer housing 202 to the component housing 170. The outer housing 202 includes a top 224 and a bottom 226 extending between the sides 220, 222. The opening 211 is provided in the top 224, such as between the mounting brackets 216. The opening 211 may additionally or alternatively be provided in the bottom 226. The cavity 206 is open at the front end 212 between the mounting brackets 216 to receive the end of the printed circuit board 150. The cavity 206 is open at the rear end 214 to receive the terminal holder 204 (shown in FIG. 5).

The outer housing 202 includes support walls extending from the rear end 214. The support walls 230 are used to support the terminal holder 204 in the cavity 206. Optionally, the support walls 230 are noncontinuous. For example, the support walls 230 may be separated by gaps. The support walls 230 are provided at the top 224 and the bottom 226. Optionally, the support walls 230 may be provided at the first side 220 and the second side 222. The support walls 230 may be chamfered to allow tilting of the terminal holder 204 relative to the outer housing 202 in the cavity 206, such as to accommodate misalignment of the power elements 106, 108.

The outer housing 202 includes a base wall 232 extending between the sides 220, 22 and/or between the top 224 and the bottom 226. The base wall 232 includes slots or openings 234 that provide access to the terminal channels in the terminal holder 204 to allow passage of the first power elements 106 into the terminal holder 204 to mate with the terminals 300. The base wall 232 may be located between the mounting brackets 216. The opening 211 is located forward of the base wall 232, such as at the top 224. The support walls 230 may extend rearward from the base wall 232.

The outer housing 202 includes latching features 240 used to secure the terminal holder 204 to the outer housing 202. In the illustrated embodiment, the latching features 240 are deflectable latching tabs configured to engage corresponding latching features of the terminal holder 204. The latching features 240 may be releasable to release the terminal holder 204 from the outer housing 202. In various embodiments, the latching features 240 are formed in the support walls 230. Alternatively, the latching features 240 may be separate from the support walls 230, such as interspersed between the support walls 230 within the gaps between the support walls 230. In the illustrated embodiment, the latching features 240 include openings 242. The openings 242 are configured to engage the corresponding latching features of the terminal holder 204. Other types of latching features may be used in alternative embodiments.

The terminal holder 204 includes one or more holder bodies 250 extending between a front end 252 and a rear end 254. The holder body 250 forms one or more terminal channels 256 configured to receive corresponding terminals 300 therein. The terminal channels 256 are open at the front end 252 and the rear end 254 to receive the power elements 106, 108, respectively. For example, the terminal holder 204 includes front openings 257 (shown in FIG. 2) that receive the first power elements 106 and rear openings 258 that receive the second power elements 108. The front openings 257 may face the base wall 232. For example, when the terminal holder 204 is coupled to the outer housing 202, the base wall 232 may partially close the front openings 257, such as to hold the terminals 300 in the terminal channels 256. The holder body 250 guides the power elements 106, 108 into the terminal channels 256 to mate with the terminals 300. Optionally, the front openings 257 and/or the rear openings 258 may include chamfered lead-in surfaces that guide the power elements 106, 108 into the terminal channels 256.

The terminal holder 204 includes a first side 260 and a second side 262 opposite the first side 260. The terminal holder 204 includes a top 264 and a bottom 266 extending between the sides 260, 262. In an exemplary embodiment, the terminal holder 204 includes latching features 268 extending from the top 264 and/or the bottom 266. The latching features 268 are configured to interface with the latching features 240 of the outer housing 202 to secure the terminal holder 204 in the cavity 206 of the outer housing 202. In the illustrated embodiment, the latching features 268 include latches each having a ramp surface at the top of the latch and a catch surface at the bottom of the latch. Other types of latching features may be provided in alternative embodiments.

In an exemplary embodiment, the terminal holder 204 includes positioning ribs 272 extending from the top 264 and/or the bottom 266. The positioning ribs 272 are configured to position the terminal holder 204 relative to the outer housing 202. In an exemplary embodiment, the support walls 230 and the latching features 240 of the outer housing 202 (both shown in FIG. 4) are received in the spaces between the positioning ribs 272. In an exemplary embodiment, the positioning ribs 272 are configured to position the terminal holder 204 for mating with the second electrical device 104. For example, the positioning ribs 272 may engage part of the second electrical device 104 to locate the header housing 200 relative to the second electrical device 104.

During assembly, the terminal holder 204 is loaded into the cavity 206 of the outer housing 202. The latching features 240 of the outer housing 202 engage the latching features 268 of the terminal holder 204 to secure the terminal holder 204 in the outer housing 202. For example, the latching features 268 are received in the openings 242 of the latching features 240. The positioning ribs 272 are used to locate the terminal holder 204 relative to the outer housing 202. The positioning ribs 272 are received in the slots 238 between the support walls 230 and the latching features 240.

In an exemplary embodiment, the support walls 230 are relatively short compared to the overall height of the holder body 250. For example, the support walls 230 may extend less than half the height of the holder body 250. As such, the terminal holder 204 is able to tilt or rotate within the cavity 206 relative to the support walls 230 to accommodate for misalignment of the first and second power elements 106, 108 (both shown in FIG. 1). The chamfered surfaces at the edges of the support walls 230 allow the terminal holder 204 to pivot relative to the outer housing 202 for plugging the second power elements 108 into the rear openings 258 of the terminal holder 204.

During assembly, the terminals 300 are loaded in the terminal channels 256. In an exemplary embodiment, a plurality of the terminals 300 are stacked together in a terminal stack 308. Each terminal channel 256 of the terminal holder 204 receives the corresponding terminal stack 308 of the terminals 300. The base wall 232 of the outer housing 202 holds the terminal stack 308 in the terminal channel 256. The terminals 300 are arranged side-by-side in the terminal stack 308. The terminals 300 function as a single terminal assembly within the terminal stack 308. However, the terminals 300 are independently movable relative to each other. The terminals 300 may be stamped and formed from thin metal sheets, but stacked together to increase the overall current carrying capacity of the terminal assembly.

When assembled, the outer housing 202 and the terminal holder 204 cooperate to form a pocket 208 that receives the corresponding terminal stack 308. The terminal holder 204 holds the terminals 300 from the rear, from the sides, from the top, and from the bottom, while the outer housing 202 holds the terminals 300 from the front by closing the pocket 208. In an exemplary embodiment, the terminal holder 204 includes lips 274 at the rear end 254 extending inward from the top 264 and the bottom 266. The lips 274 are provided on opposite sides of the rear opening 258. The lips 274 support the terminals 300 in the pocket 208. For example, the lips 274 support the first and second rear spring beams 322, 324. The rear opening 258 is aligned with the rear socket 320 to receive the second power element 108. In an exemplary embodiment, the outer housing 202 includes the opening 234 aligned with the front opening 257 of the terminal holder 204. The base wall 232 covers the front opening 257 of the terminal holder 204. The opening 234 in the base wall 232 is aligned with the front socket 310 to receive the first power element 106. For example, the first power element 106 passes through the opening 234 in the base wall 232 and through the front opening 257 of the terminal holder 204 into the terminal channel 256 to interface with the terminals 300. The opening 234 may be chamfered to guide the first power element 106 into the socket 310. In an exemplary embodiment, the edge 162 of the printed circuit board 150 is received in the terminal channel 256 to directly mate with the terminals 300. For example, the edge 162 of the printed circuit board 150 is received in the front socket 310 between the spring beams 312, 314. The spring beams 312, 314 directly engage the power pads 158 on the upper and lower surfaces 152, 154 of the printed circuit board 150. However, in alternative embodiments, a power adapter (for example a metal cap) may be provided at the edge 162 to create an interface between the sockets 310 and the power pads 158 of the printed circuit board 150.

In an exemplary embodiment, the terminal channel 256 is oversized relative to the terminals 300 to allow a limited amount of confined movement of the terminals 300 within the terminal channel 256. For example, the terminals 300 may be shifted front to rear and/or shifted side to side and/or rotated or pivoted top to bottom for mating with the first and second power elements 106, 108. For example, when the first and second power elements 106, 108 are offset from each other, the terminals 300 may be shifted or moved within the terminal channel 256 to accommodate for the misalignment. Similarly, the cavity 206 of the outer housing 202 is oversized relative to the terminal holder 204 to allow a limited amount of confined movement of the terminal holder 204 within the cavity 206. For example, the terminal holder 204 may be shifted front to rear and/or shifted side to side and/or rotated or pivoted top to bottom for mating with the first and second power elements 106, 108. For example, when the first and second power elements 106, 108 are offset from each other, the terminal holder 204 may be shifted or moved within the cavity 206 to accommodate for the misalignment.

Tolerances are built into the header power connector 100 to accommodate plugging the first and second power elements 106, 108 into the terminal channel 256. For example, tolerances are built into the outer housing 202 and the terminal holder 204 and tolerances are built into the terminal 300 and the terminal channel 256 of the terminal holder 204. In various embodiments, the cavity 206 is oversized relative to the terminal holder 204 such that gaps are formed between inner surfaces of the outer wall 210 and outer surfaces of the holder body 250. The gaps provide some play and movement between the terminal holder 204 and the outer housing 202. In various embodiments, the terminal channel 256 is oversized relative to the terminal 300 such that gaps are formed between inner surfaces of the terminal holder 204 and the sides of the terminal 300. The gaps provide some play and movement between the terminal 300 and the terminal holder 204. When the first and second power elements 106, 108 are offset, the terminal holder 204 may be moved relative to the outer housing 202 to accommodate the misalignment and/or the terminal 300 may be moved relative to the terminal holder 204 to accommodate the misalignment.

Figure 5:
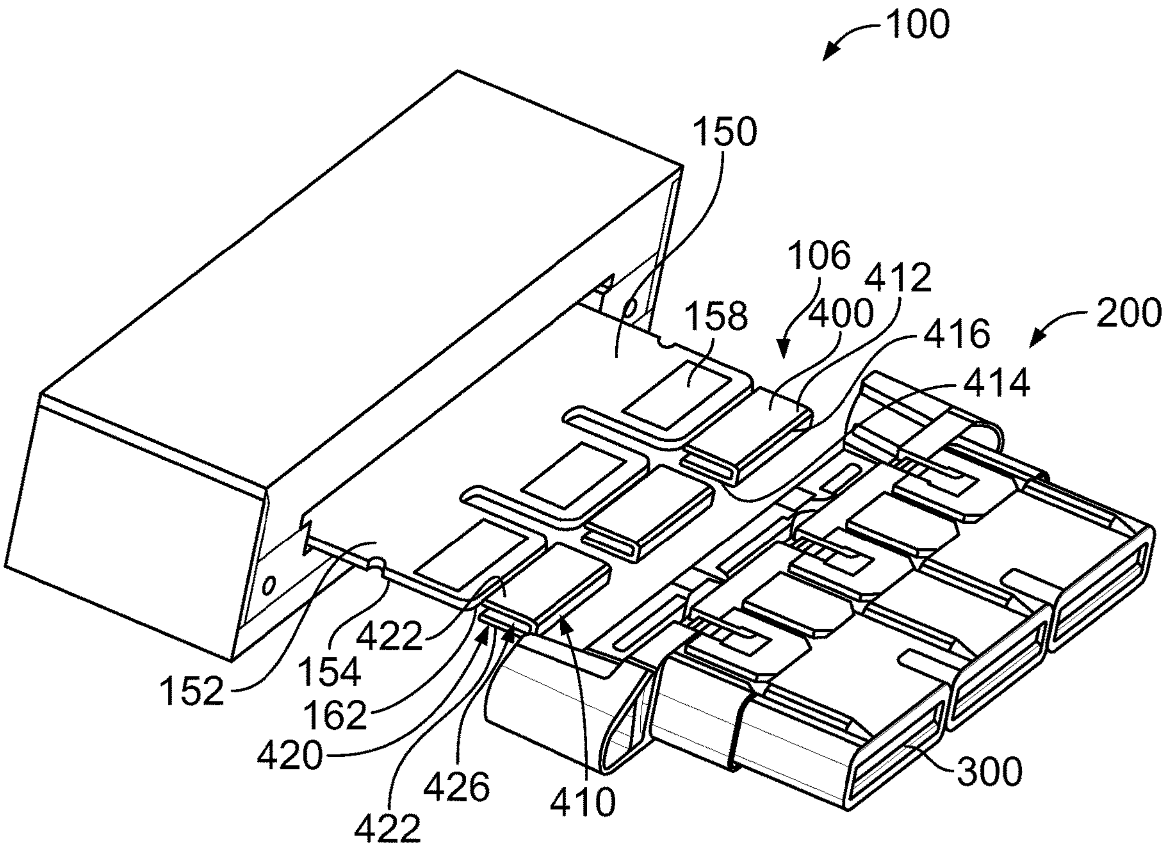
FIG. 5 is an exploded, perspective view of the header power connector showing the header housing and the terminals poised for mating with the power elements of the printed circuit board in accordance with an exemplary embodiment.
Figure 6:
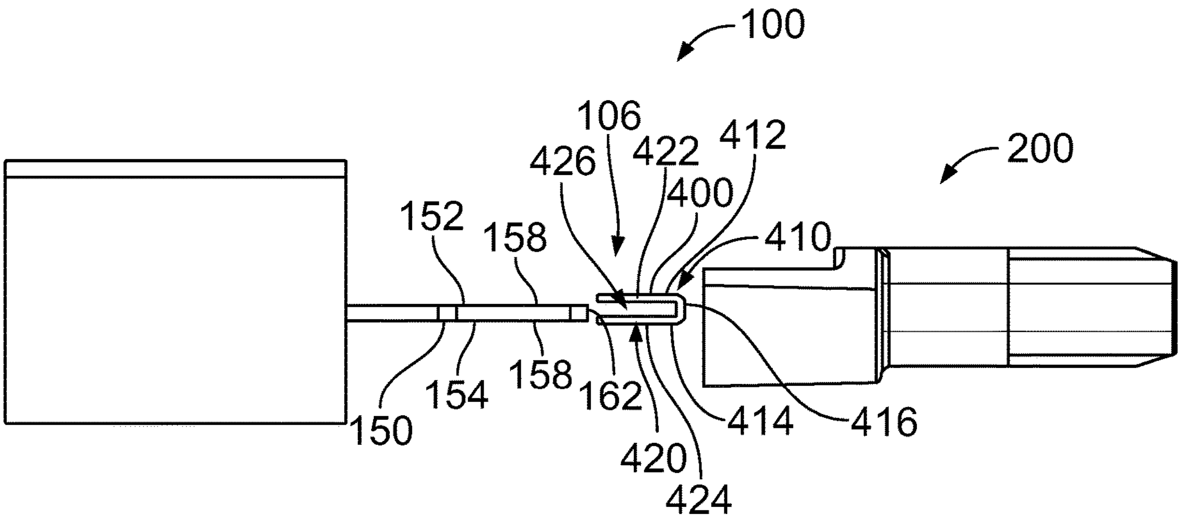
FIG. 6 is an exploded, side view of the header power connector showing the header housing and the terminals poised for mating with the power elements of the printed circuit board in accordance with an exemplary embodiment.
Figure 7:
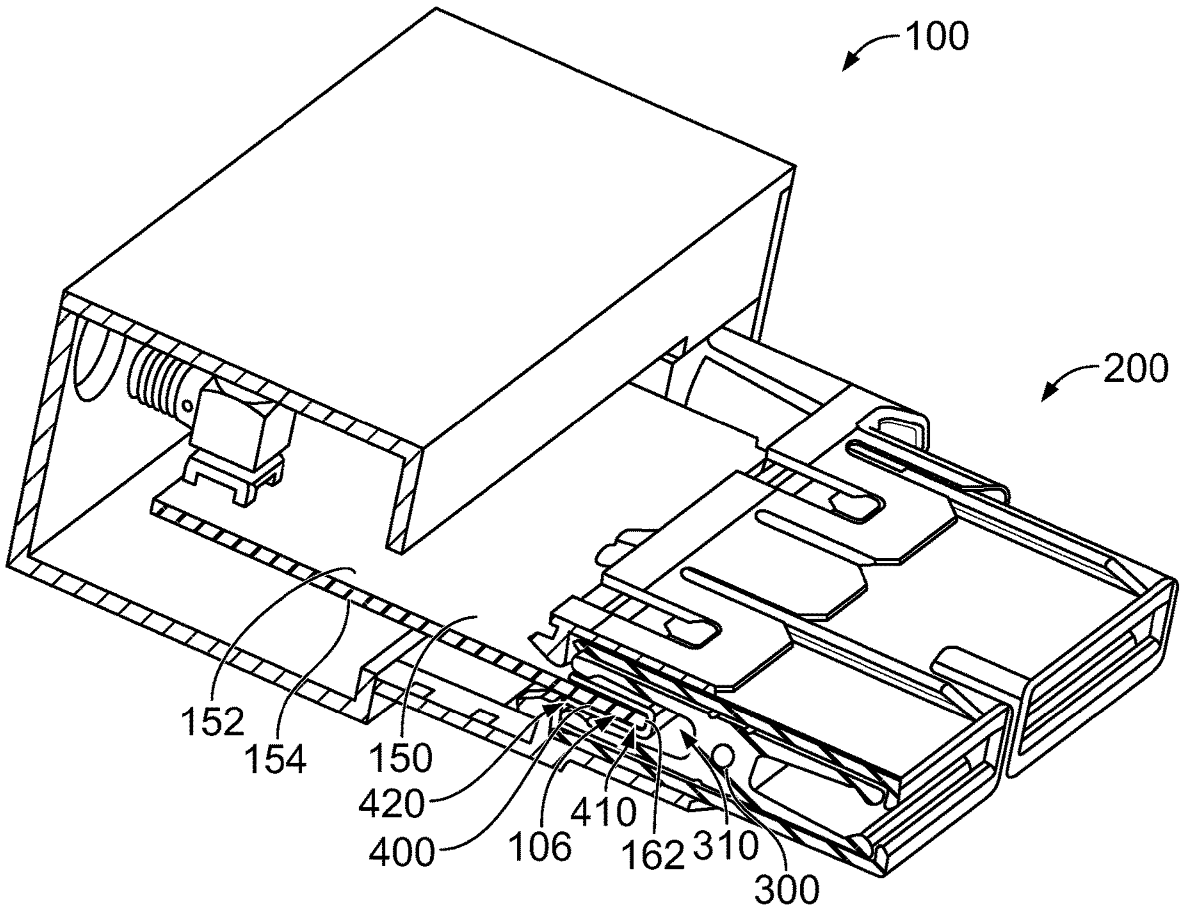
FIG. 7 is a sectional view of the header power connector in accordance with an exemplary embodiment.
Figure 8:
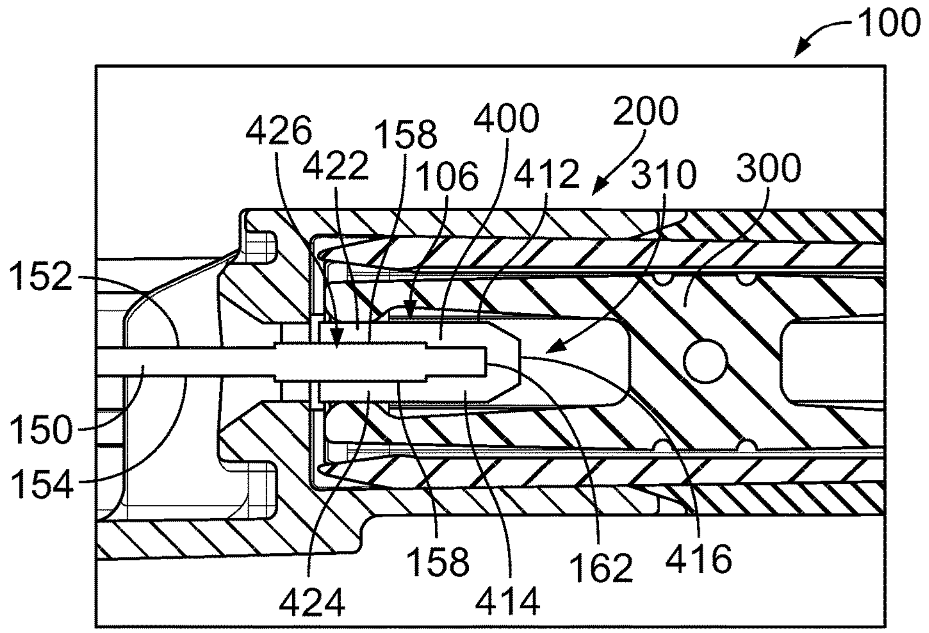
FIG. 8 is a cross sectional view of a portion of the header power connector in accordance with an exemplary embodiment.

FIG. 5 is an exploded, perspective view of the header power connector 100 showing the header housing 200 and the terminals 300 poised for mating with the power elements 106 of the printed circuit board 150 in accordance with an exemplary embodiment. FIG. 6 is an exploded, side view of the header power connector 100 showing the header housing 200 and the terminals 300 poised for mating with the power elements 106 of the printed circuit board 150 in accordance with an exemplary embodiment. FIG. 7 is a sectional view of the header power connector 100 in accordance with an exemplary embodiment. FIG. 8 is a cross sectional view of a portion of the header power connector 100 in accordance with an exemplary embodiment. FIGS. 5-8 illustrate a power adapter 400 forming a portion of the power element 106 configured to electrically connect between the printed circuit board 150 and the terminals 300. The power adapter 400 indirectly couples the power pads 158 to the terminals 300 to supply power to the power circuit board 150.

The power adapter 400 includes a mating portion 410 and a board portion 420. The board portion 420 is configured to be coupled to the printed circuit board 150. In various embodiments, the power adapter 400 has an open end and a closed end, such as being is U-shaped. The power adapter 400 may be clipped or otherwise coupled to the edge 162 of the printed circuit board 150. In an exemplary embodiment, the board portion 420 includes an upper wall 422 and a lower wall 424 with a pocket 426 therebetween. The pocket 426 receives the edge 162 of the printed circuit board 150. The upper wall 422 extends along the upper surface 152 of the printed circuit board 150. The upper wall 422 is electrically connected to the power pad 158 on the upper surface 152. For example, the upper wall 422 may be soldered to the power pad 158 or may engage the power pad 158 by an interference fit. The lower wall 424 extends along the lower surface 154 of the printed circuit board 150. The lower wall 424 is electrically connected to the power pad 158 on the lower surface 154. For example, the lower wall 424 may be soldered to the power pad 158 or may engage the power pad 158 by an interference fit.

The mating portion 410 is configured to be mated to the terminals 300. The mating portion 410 includes an upper mating interface 412 and a lower mating interface 414. The mating portion 410 includes a tip 416 at the mating end of the power adapter 400. The tip 416 is configured to be plugged into the header housing 200 and the sockets 310 of the terminals 300. The tip 416 may be defined by a wall or block at the end of the pocket 426. The mating portion 410, at the tip 416, has a width or thickness sized to fit in the socket 310. The tip 416 may be chamfered to guide loading into the socket 310.

Figure 9:
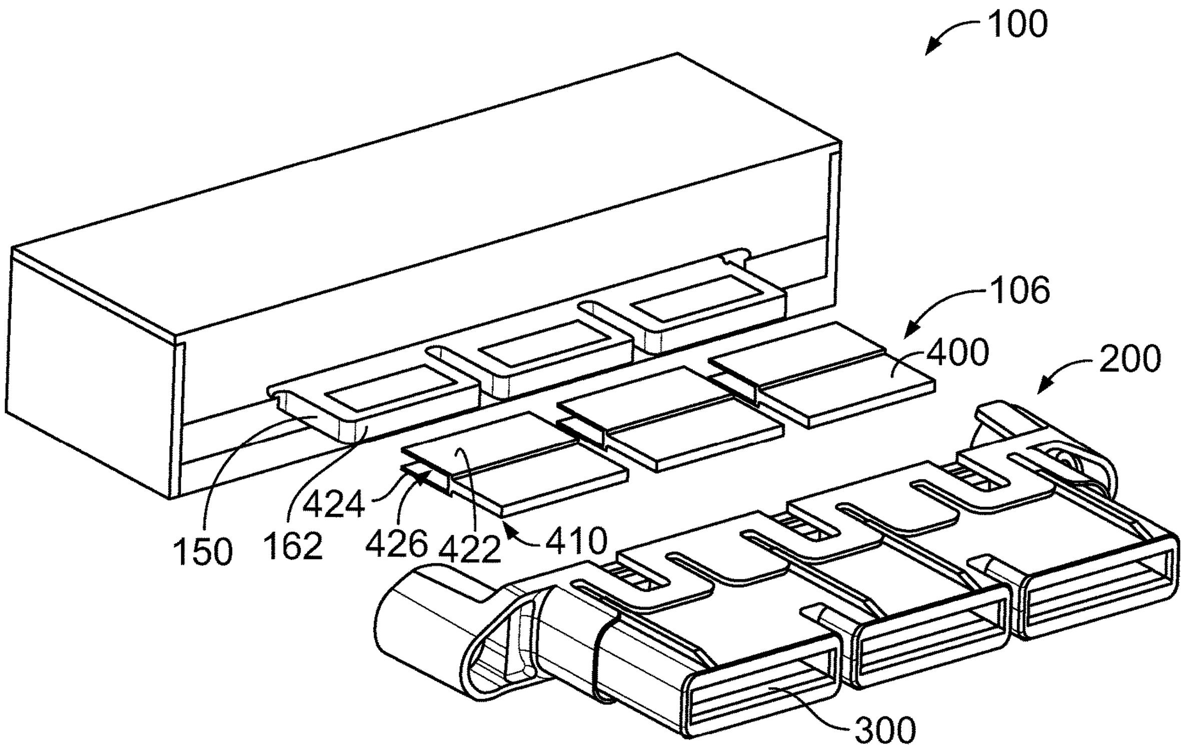
FIG. 9 is an exploded, perspective view of the header power connector showing the header housing and the terminals poised for mating with the power elements of the printed circuit board 150 in accordance with an exemplary embodiment.
Figure 10:
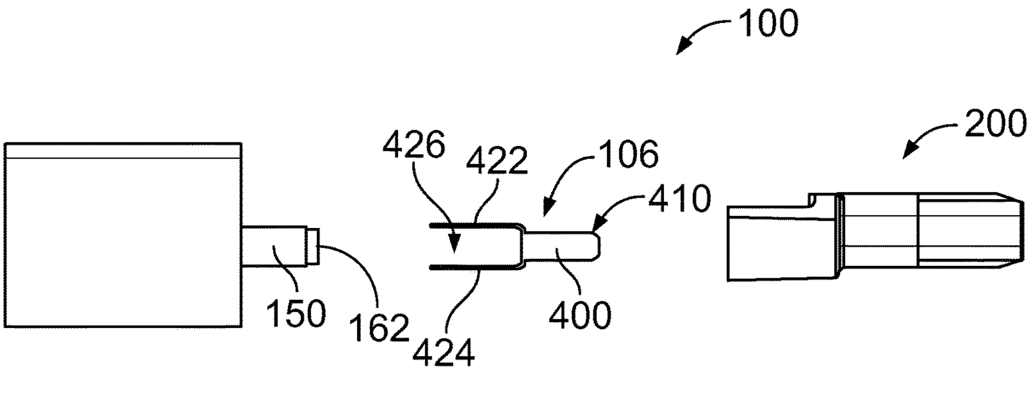
FIG. 10 is an exploded, side view of the header power connector showing the header housing and the terminals poised for mating with the power elements of the printed circuit board in accordance with an exemplary embodiment.
Figure 11:
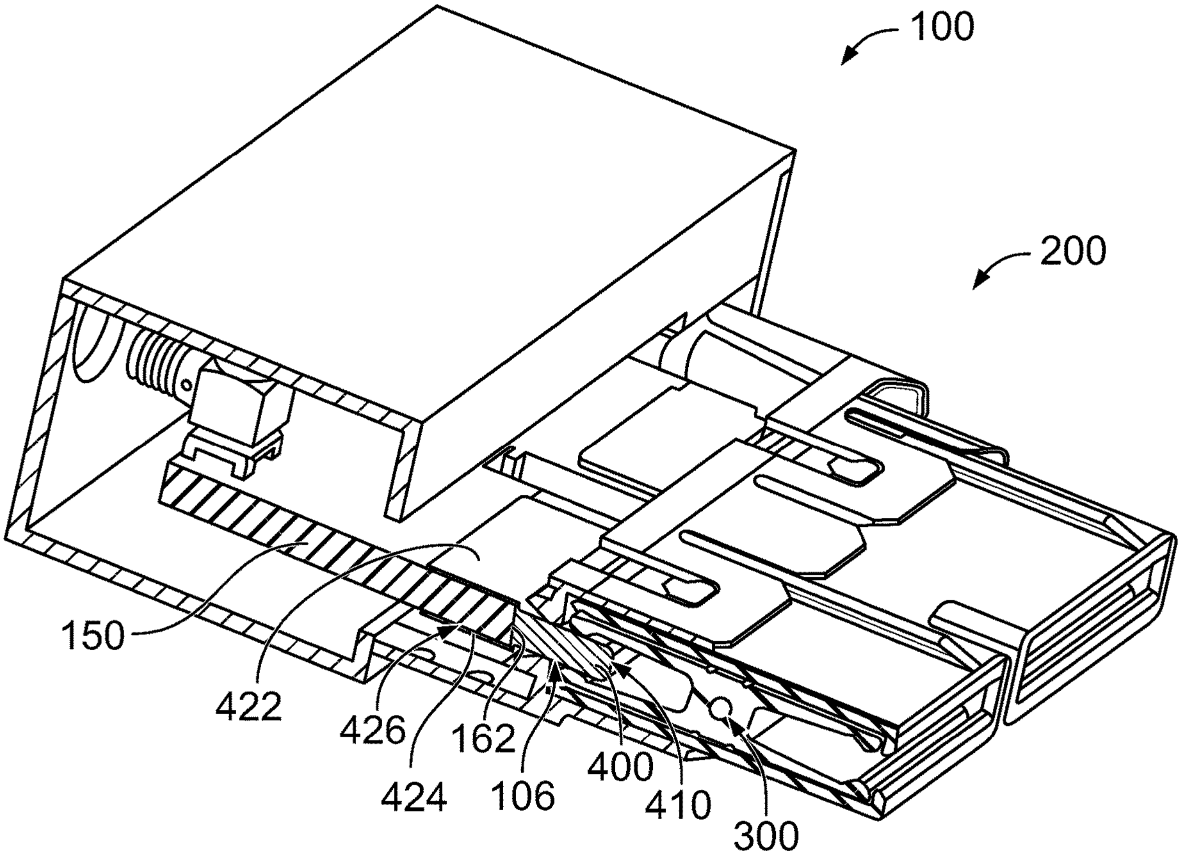
FIG. 11 is a sectional view of the header power connector in accordance with an exemplary embodiment.
Figure 12:
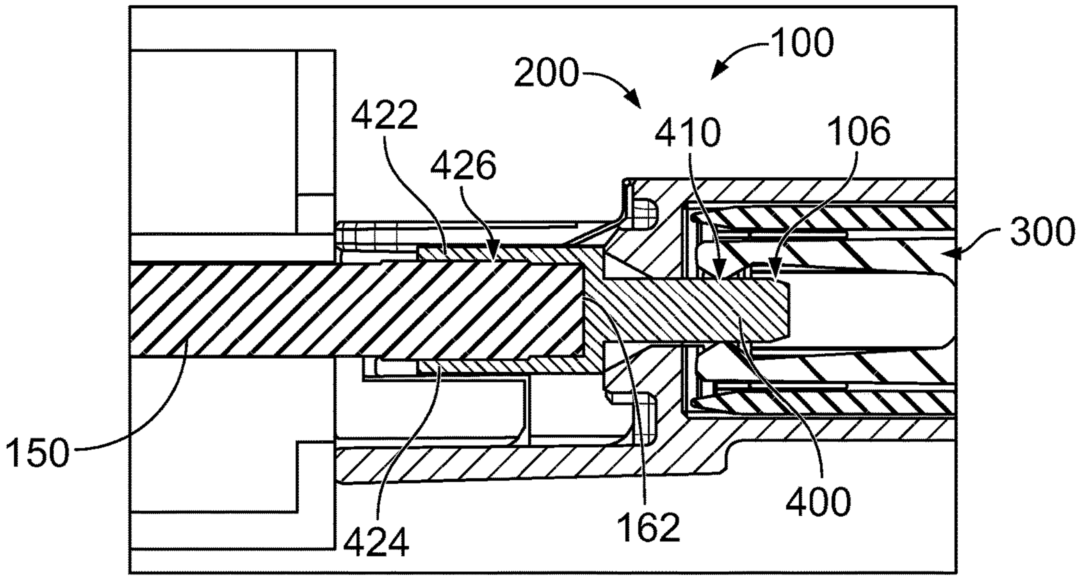
FIG. 12 is a cross sectional view of a portion of the header power connector in accordance with an exemplary embodiment.

FIG. 9 is an exploded, perspective view of the header power connector 100 showing the header housing 200 and the terminals 300 poised for mating with the power elements 106 of the printed circuit board 150 in accordance with an exemplary embodiment. FIG. 10 is an exploded, side view of the header power connector 100 showing the header housing 200 and the terminals 300 poised for mating with the power elements 106 of the printed circuit board 150 in accordance with an exemplary embodiment. FIG. 11 is a sectional view of the header power connector 100 in accordance with an exemplary embodiment. FIG. 12 is a cross sectional view of a portion of the header power connector 100 in accordance with an exemplary embodiment.

FIGS. 9-12 illustrate the power adapter 400 forming a portion of the power element 106 configured to electrically connect between the printed circuit board 150 and the terminals 300. In the illustrated embodiment, the power adapter 400 is sized and shaped differently than the power adapter shown in FIGS. 5-8. The power adapter 400 shown in FIGS. 9-12 is configured to be coupled to the edge 162 of a thicker printed circuit board 150 and the power adapter 400 shown in FIGS. 9-12 is configured to be coupled to the edge 162 of a thinner printed circuit board 150. The mating portions 410 of both power adapters 400 may have the same thickness; however, the pockets 426 between the upper and lower walls 422, 424 may have different heights to accommodate the different thickness boards.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. A header power connector comprising:

a header housing including an outer housing and a terminal holder received in a cavity of the outer housing, the outer housing having a base and an outer wall extending from the base to form the cavity, the terminal holder having a holder body forming a terminal channel, the terminal holder having a front opening at a front of the terminal holder and a rear opening at a rear of the terminal holder;

a terminal stack received in the terminal channel, the terminal stack including a plurality of terminals arranged in a stacked configuration, each terminal including a terminal base, a front mating end forward of the terminal base and a rear mating end rearward of the terminal base, the front mating end including a front socket flanked by front spring beams, the rear mating end including a rear socket flanked by rear spring beams, the front socket aligned with the front opening, the rear socket aligned with the rear opening and configured to receive a power supply element, wherein the rear spring beams are configured to engage opposite sides of the power supply element; and a printed circuit board having power pads along upper and lower surfaces of the printed circuit board, the printed circuit board having an edge configured to be received in the front opening, wherein the front spring beams are electrically connected to the power pads at the upper and lower surfaces of the printed circuit board to supply power to the printed circuit board.

2. The header power connector of claim 1, wherein the front spring beams are electrically connected to the printed circuit board at separable mating interfaces.

3. The header power connector of claim 1, wherein the front spring beams are directly connected to the power pads of the printed circuit board.

4. The header power connector of claim 1, wherein the edge of the printed circuit board is plugged into the front socket between the front spring beams.

5. The header power connector of claim 1, further comprising a power adapter coupled to the edge of the printed circuit board, the power adapter being electrically connected to the power pads on the upper and lower surfaces of the printed circuit board, the power adapter having a mating portion configured to be received in the front socket to mate with the terminals of the terminal stack.

6. The header power connector of claim 5, wherein the power adapter includes an upper portion and a lower portion, the power adapter having a pocket between the upper portion and the lower portion, the pocket receives the edge of the printed circuit board, the upper portion extends along the upper surface of the printed circuit board, the lower portion extends along the lower surface of the printed circuit board.

7. The header power connector of claim 5, wherein the mating portion has a thickness greater than a thickness of the printed circuit board.

8. The header power connector of claim 5, wherein the mating portion has a thickness less than a thickness of the printed circuit board.

9. The header power connector of claim 5, wherein the mating portion is coplanar with the printed circuit board.

10. The header power connector of claim 1, further comprising a component housing forming an enclosure, the component housing holding at least one electrical component in the enclosure, the printed circuit board received in the enclosure, the outer housing of the header housing coupled to the component housing.

11. The header power connector of claim 10, wherein the outer housing includes a mounting bracket mounted to the component housing.

12. The header power connector of claim 10, wherein the printed circuit board passes through an opening in the component housing rearward of the component housing, the edge located rearward of the component housing for mating with the terminal stack.

13. The header power connector of claim 1, wherein the outer housing covers a portion of the front opening to hold the terminal stack in the terminal channel, the outer housing including a slot aligned with the socket to receive the edge of the printed circuit board.

14. The header power connector of claim 1, wherein the terminal stack is a first terminal stack, the holder body forming a second terminal channel receiving a second terminal stack, the second terminal stack configured to be electrically connected to the corresponding power pads on the upper and lower surfaces of the printed circuit board.

15. The header power connector of claim 1, wherein the terminals are arranged side-by-side in the terminal stack form a continuous conductive block.

16. The header power connector of claim 1, wherein the terminals are independently movable within the terminal stack.

17. A header power connector comprising:

a component housing forming an enclosure, the component housing holding at least one electrical component in the enclosure;

a printed circuit board received in the enclosure, the printed circuit board being electrically connected to the at least electrical component, the printed circuit board including power pads along upper and lower surfaces of the printed circuit board, the printed circuit board having an edge;

a header housing including an outer housing coupled to the component housing and a terminal holder received in a cavity of the outer housing, the outer housing having a base and an outer wall extending from the base to form the cavity, the terminal holder having a holder body forming a terminal channel, the terminal holder having a front opening at a front of the terminal holder and a rear opening at a rear of the terminal holder;

a terminal stack received in the terminal channel, the terminal stack including a plurality of terminals arranged in a stacked configuration, each terminal including a terminal base, a front mating end forward of the terminal base and a rear mating end rearward of the terminal base, the rear mating end including a rear socket flanked by rear spring beams, the rear socket aligned with the rear opening and configured to receive a power supply element, wherein the rear spring beams are configured to engage opposite sides of the power supply element, the front mating end including a front socket flanked by front spring beams, the front socket aligned with the front opening;

wherein the edge of the printed circuit board is received in the front opening, the front spring beams being electrically connected to the power pads at the upper and lower surfaces of the printed circuit board to supply power to the printed circuit board.

18. The header power connector of claim 17, wherein the outer housing includes a mounting bracket mounted to the component housing.

19. The header power connector of claim 17, wherein the printed circuit board passes through an opening in the component housing rearward of the component housing, the edge located rearward of the component housing for mating with the terminal stack.

20. A header power connector comprising:

a header housing including an outer housing and a terminal holder received in a cavity of the outer housing, the outer housing having a base and an outer wall extending from the base to form the cavity, the terminal holder having a holder body forming a terminal channel, the terminal holder having a front opening at a front of the terminal holder and a rear opening at a rear of the terminal holder;

a terminal stack received in the terminal channel, the terminal stack including a plurality of terminals arranged in a stacked configuration, each terminal including a terminal base, a front mating end forward of the terminal base and a rear mating end rearward of the terminal base, the front mating end including a front socket flanked by front spring beams, the rear mating end including a rear socket flanked by rear spring beams, the front socket aligned with the front opening, the rear socket aligned with the rear opening and configured to receive a power supply element, wherein the rear spring beams are configured to engage opposite sides of the power supply element; and a printed circuit board assembly including a printed circuit board and a power adapter coupled to an edge of the printed circuit board, the printed circuit board having power pads along upper and lower surfaces of the printed circuit board, the power adapter having an upper portion extending along the upper surface of the printed circuit board coupled to the power pad on the upper surface of the printed circuit board, the power adapter having a lower portion extending along the lower surface of the printed circuit board coupled to the power pad on the lower surface of the printed circuit board, the power adapter having a mating portion configured to be received in the front opening, wherein the front spring beams are configured to engage the mating portion of the power adapter, the power adapter electrically connecting the front spring beams to the power pads at the upper and lower surfaces of the printed circuit board to supply power to the printed circuit board.

* * * * *